No. 845,106. PATENTED FEB. 26, 1907.
H. P. MAXIM.
MOTOR ROAD VEHICLE.
APPLICATION FILED MAY 26, 1899.
3 SHEETS—SHEET 2.
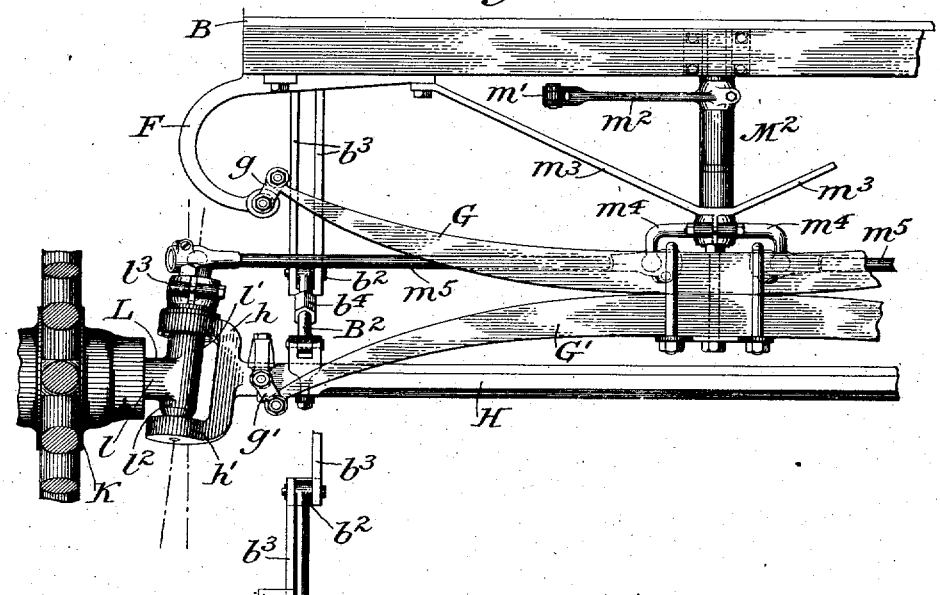
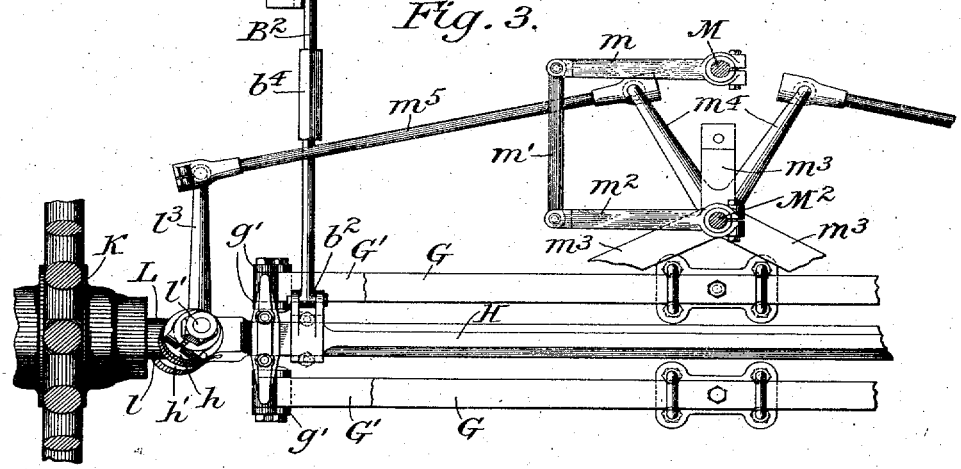
Attest:
A. N. Jesbera
John M. Scobb
Inventor:
Hiram Percy Maxim
by Redding, Kiddle & Greeley
Attys.

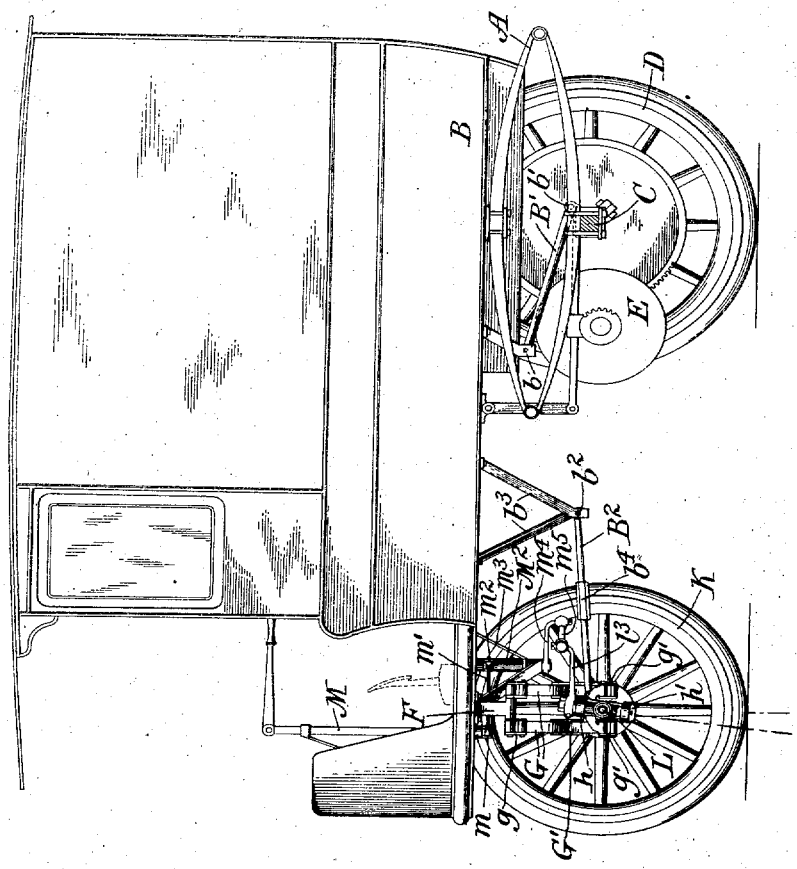

No. 845,106. PATENTED FEB. 26, 1907.
H. P. MAXIM.
MOTOR ROAD VEHICLE.
APPLICATION FILED MAY 26, 1899.
3 SHEETS—SHEET 3.
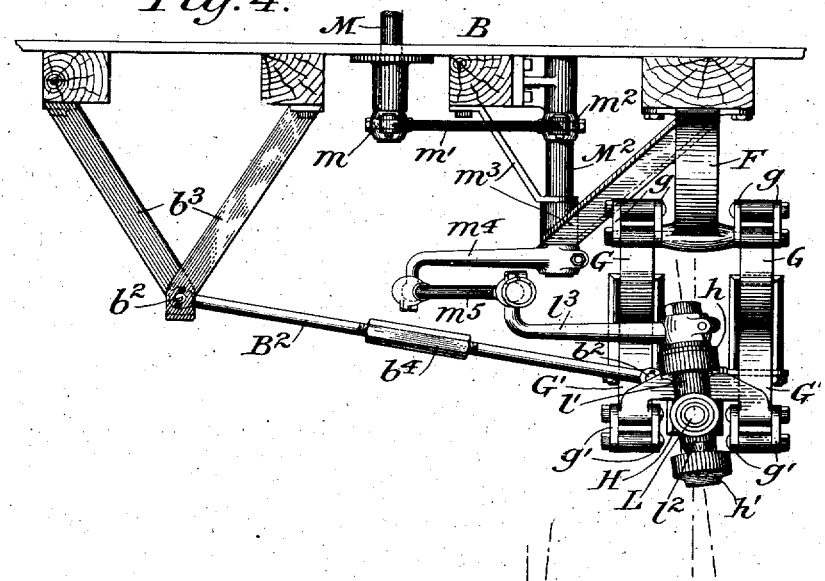
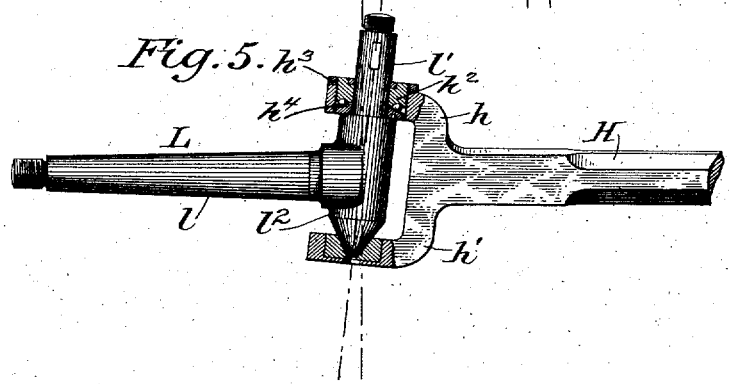
Attest:
A. N. Jesbera
John M. Scoble
Inventor:
Hiram Percy Maxim
by Redding, Kiddle & Greeley
Attys.

UNITED STATES PATENT OFFICE.

HIRAM PERCY MAXIM, OF HARTFORD, CONNECTICUT, ASSIGNOR, BY MESNE ASSIGNMENTS, TO ELECTRIC VEHICLE COMPANY, OF NEW YORK, N. Y., AND JERSEY CITY, NEW JERSEY, A CORPORATION OF NEW JERSEY.

MOTOR ROAD-VEHICLE.

No. 845,106.     Specification of Letters Patent.     Patented Feb. 26, 1907.

Application filed May 26, 1899. Serial No. 718,363.

*To all whom it may concern:*

Be it known that I, HIRAM PERCY MAXIM, a citizen of the United States, residing in Hartford, in the State of Connecticut, have invented certain new and useful Improvements in Motor Road-Vehicles, of which the following is a specification, reference being had to the accompanying drawings, forming a part hereof.

This invention relates to self-propelled road-vehicles as distinguished from horse-vehicles and from vehicles which run upon fixed tracks.

The invention is particularly concerned with the running-gear and with the support and operation of the steering-wheels.

The object of the invention in general is to improve the construction of such vehicles as to the parts referred to.

One special object in view is to produce an improved interchangeable running-gear—that is to say, a running-gear in fixed sizes—which can be applied readily to any ordinary form of body, whether a carriage-body—such as a landau, coupé, Victoria, &c.—or an omnibus-body or a body for a utility or business wagon, the front or steering part of the running-gear and the rear or driving part being wholly independent the one of the other and not requiring any direct connection between the two, whereby the running-gear can be applied to any vehicle-body regardless of its length.

Another object in view is to improve the construction of the front or steering part of the running-gear, so that it shall properly support the corresponding end of the body and properly perform its functions. The means of support of the steering-wheels have also been improved in order that the manipulation of the steering mechanism may be made easier and the effect of obstructions on the roadway in deflecting the steering-wheels may be reduced.

Other features of the improvement will be more particularly referred to hereinafter with reference to the accompanying drawings, in which for purposes of explanation the invention is represented as embodied in or applied to the convenient mechanical structure.

In the drawings, Figure 1 is a view in side elevation of a delivery-wagon equipped with the present improvements, both of the near wheels being removed and the rear axle being shown in section. Fig. 2 is a view in front elevation, on a larger scale than Fig. 1, of a portion of the front member of the running-gear with its appurtenant parts, one of the independent steering-wheels being represented in part. Fig. 3 is a plan view of the parts shown in Fig. 2 with the hangers for the springs omitted and the steering-pillars shown in section. Fig. 4 is a view in elevation from the right-hand side of the vehicle of the parts shown in Fig. 2 with the steering-wheel omitted. Fig. 5 is a detail view, on a still larger scale, illustrating particularly the supplemental axle and its relation to the main axle.

The improved running-gear, as indicated hereinbefore, consists of two parts which are wholly independent the one of the other and have no direct connection other than through the wagon-body, to which they are both secured, whereby one style or size of running-gear can be applied readily to any variety of body and whereby it becomes immaterial, so far as concerns the running-gear, what the shape or length of the wagon-body may be within reasonable limits.

In the construction shown in the drawings the rear or driving part of the running-gear on which the driving mechanism is supported comprises suitable springs, (indicated at A,) which are secured to the wagon-body B, and a fixed axle C, which is secured to the spring-system A and supports the driving-wheels, one of which is represented at D. The driving mechanism is sufficiently indicated at E.

It is obvious that the requirements of the two-wheel driving-truck of a motor road-vehicle are quite different from the requirements of a four-wheel track-vehicle, and particularly in that there should be freedom for relative vertical movement of the axle and the wagon-body without any swiveling action of the truck or displacement of the axle with respect to the body in a horizontal plane. In order to meet this special requirement in the present case, the other requirements permitting of the employment of no longitudinal reach, as in ordinary running-gear frames, the axle is connected to the wagon-body, so as to resist longitudinal thrust or displacement in a horizontal plane by a jack-bolt B', one being provided at each end of the axle and connected to the axle and to the body by a hinge or pivot connection, as at b', so as to permit of the vertical movement of the axle with respect to the body, and in order that the vertical component of the thrust to which the jack-bolt is subjected may be as small as practicable the point of attachment of the jack-bolt to the body is lowered toward the plane of the axle by a bracket b, which is secured rigidly to the body and has the jack-bolt connected to its lower end. It will be observed, furthermore, that in a motor road-vehicle in which the driving mechanism pushes the body and, through the body, pushes the steering-wheels it is a decided advantage to transmit the thrust to the steering-wheels through these jack-bolts, which not only sustain the thrust during the vertical vibrations of the front axle to accommodate an uneven road-surface, but resist the added strain on the axle when the wheels meet obstructions.

The front or steering part of the running-gear is likewise connected independently to the body of the wagon and in the construction shown comprises brackets or hangers F, secured to the wagon-body, a double set of upper springs G and lower springs G', and a front axle H, which is free to move in a vertical plane, but not in a horizontal plane. The upper and lower springs are secured together by suitable means, the upper springs being connected by links g to the brackets F and the lower springs being connected by links g' to the front axle H. The two lower springs straddle the axle. This arrangement of itself makes the front part or member of the steering-gear comparatively rigid in a horizontal plane, while permitting free movement in a vertical plane. The resistance of the front part of the running-gear to longitudinal thrust is, however, positively assured by jack-bolts B², which have a hinge or link connection with the axle and with the body, as at b², the point of connection of each jack-bolt to the body being lowered to approach the plane of the axle for the reason already stated in the description of the rear part of the running-gear by suitable brackets b³. As the axle is continually vibrating with respect to the body, the plane of the connections b² need only approximate the average level of the connections with the axle. The jack-bolts B² are preferably made in two parts with a turnbuckle connection b⁴, so as to permit desired adjustment to be effected.

The independent steering-wheels, one of which is shown at K, are mounted to rotate, respectively, upon a stud-axle or supplemental axle L, which is swiveled in or on the corresponding end of the main axle H. In order to make the manipulation of the steering mechanism easy, the wheel-pivot axis is given both an outward and a forward inclination, the former to reduce the effect of twisting due to the encountering of obstructions by the wheels and the latter (the prolonged axis intersecting the ground in front of the center of contact of the wheel) to make the wheel trail, and consequently during movement of the vehicle to tend to assume a position parallel with the longitudinal axis of the vehicle. It is obvious that the means for supporting each steering-wheel so that its swiveling axis shall be inclined outwardly and inclined forwardly may be varied in different constructions; but in the construction which has been chosen for illustration and explanation of the invention each end of the front axle is formed with a fork or yoke, the upper and lower members h and h' of which form or support the bearings upon which the stud-axle swivels, the axis of such bearings being inclined forwardly, so that prolonged it would strike the ground ahead of the center of the wheel-base, or, in other words, in advance of a line connecting the points of contact of each wheel with the ground, and being inclined outwardly, so that prolonged it would strike the ground near the line of the wheel-base. The upper bearing in the arm h is preferably a ball-bearing or bearing having a relatively broad bearing-surface or large diameter, as shown in Fig. 5, to permit of adjustment and to take up the main thrust, while the lower bearing in the arm h' may be a cone-bearing.

In order that the entire thrust due to the weight borne by the end of the axle and transmitted through the upper arm h to the spindle l' l² may be properly taken up, the construction shown in this Fig. 5 is found desirable.

It will be observed that the upper anti-friction-bearing, through which the upper end of the spindle passes, is of relatively large dimensions and comprises a threaded adjustable annulus h², held by a lock-nut h³, the race for the balls h⁴ being formed between the annulus h² and an annulus supported on a shoulder of the spindle.

The stud or supplemental axle L, upon which the steering-wheel is journaled, has three integral arms, one arm, l, forming the bearing for the wheel and the other two arms, l' and l², having bearings in the upper and lower arms h and h' of the front axle H.

It will be observed that the arm or member l is obliquely disposed with respect to the arms l' and l² or with respect to their common axis, so that in its normal position the axis about which the wheel rotates is substantially horizontal.

It will also be observed, Fig. 3, that the stud or supplementary axles in their normal position are in alinement with and substantially continuations of the main axle, in consequence of which the axes proper of the supplemental axles, and therefore the axes of the wheels, are in substantially the same vertical plane in which the main axle is supported, and if this were not the case the weight of the load or carriage, which falls entirely upon the stud-axles, would produce a twisting tendency in the stud-axle supports which would be transmitted to the main axle.

The main steering-post M is mounted, as usual, upon the body of the vehicle in a convenient position and is provided with an arm $m$, which is connected by a link $m'$ with an arm $m^2$, secured to a supplementary steering-post $M^2$, supported in a bearing secured on the under side of the body and a bearing supported by braces $m^3$. Diverging arms $m^4$ are also secured to the supplementary steering-post and are connected by links $m^5$ with the steering-arms $l^3$, secured to the respective stud-axles L, preferably to the upper extremity of the arm $l'$ of each. This arrangement of supplementary steering-posts, arms, and links constitutes a form of transmission mechanism between the main steering-post and the stud-axle which permits of all variations of relative position possible between steering-wheels and body without cramping or straining the steering connections or deflecting or otherwise affecting the steering-handle. It is to be noted, however, that the invention is not limited to the precise form of transmission mechanism between the main steering-post and the stud-axle shown and described, for any other suitable form of transmission mechanism may be used.

The mode of operation and the advantages of the several features of improvement have been set forth sufficiently and require no further explanation herein.

It will be understood that the invention is not to be limited to the precise details of construction and arrangement of parts herein described.

I claim as my invention—

1. An interchangeable running-gear for motor-vehicles consisting of two distinct parts, one part embodying a transverse axle, independent steering-wheels, a spring connecting the axle with the body of the vehicle to support the body, rigid brackets adapted to be secured to the body and extended downward toward the plane of the axle, and jack-bolts connecting the axle with said brackets to permit relative vertical movement of the axle and the body and to prevent relative horizontal movement of the axle and the body, the other part of the running-gear embodying a wheel system, a spring system connecting the wheel system with the body of the vehicle and driving mechanism, substantially as shown and described.

2. An interchangeable running-gear for motor-vehicles consisting of two distinct parts, one of said parts including the steering-wheels and connected independently to the body of the vehicle, the other part comprising an axle, a spring system forming the connection between the axle and the body of the vehicle, a driving mechanism, supported wholly on said part and jack-bolts connecting the axle with the body of the vehicle to permit relative vertical movement of the axle and the body and to prevent relative horizontal movement of the axle and the body.

3. A two-wheeled truck for a motor road-vehicle comprising an axle, wheels supported thereby, brackets adapted to be secured to the body of the vehicle, one at each side thereof, springs secured to said brackets and to said axle substantially in the plane of the wheel centers, and jack-bolts connected to said axle and to the body to permit relative vertical movement of the axle and body and to prevent relative horizontal movement of the axle and body, substantially as shown and described.

4. A two-wheeled truck for a motor road-vehicle comprising an axle, wheels supported thereby, brackets adapted to be secured to the body of the vehicle, one at each side thereof, springs secured to said brackets and to said axle, substantially in the plane of the wheel centers, hangers depending from the vehicle-body, one at each side thereof, and jack-bolts to connect the axle with the body and permit relative vertical movement of the axle and body while preventing relative horizontal movement of the axle and the body, substantially as shown and described.

5. A two-wheeled steering-truck for motor road-vehicles comprising a main axle, a spring system to connect the axle with the body, supplementary axles swiveled upon the ends of said main axle to receive the steering-wheels, jack-bolts to connect the main axle with the body, a steering-post supported on the body and universally-jointed connections between the steering-post and said supplementary axles and permit relative vertical movement of the axle and body while preventing relative horizontal movement of the axle and body, substantially as shown and described.

6. In a motor road-vehicle, the combination with a main axle and means to connect the same to the body of the vehicle, of a supplementary axle swiveled on the main axle at each end thereof to support the steering-wheels, the swiveling axis of said supplementary axle prolonged striking the ground in front of the center of contact of the wheel and being inclined outwardly, substantially as shown and described.

7. In a motor road-vehicle, the combination with a main axle and means to connect the same to the body of the vehicle, of a supplementary axle swiveled on the main axle at each end thereof to support the steering-wheels, the swiveling axis of said supplementary axle being inclined forwardly so that prolonged it will strike the ground in front of the center of contact of the wheel and being inclined outwardly so that prolonged it will strike the ground near the line of contact of the wheel, substantially as shown and described.

8. In a motor road-vehicle, the combination with the running-gear frame and a fork or yoke carried thereby, of a three-armed supplementary axle, two of said arms having bearings in the members of said fork or yoke and the third arm being adapted to receive a vehicle-wheel and having its axis obliquely disposed with respect to the axis of the two arms first mentioned, the axis of said bearings being inclined forwardly so that prolonged it will strike the ground in front of the center of contact of the wheel, substantially as shown and described.

9. In a motor road-vehicle, the combination with an axle having a fork or yoke at each end and means to connect the axle to the body of the vehicle, of a three-armed supplementary axle, two of said arms having bearings in the members of said fork or yoke and the third arm being adapted to receive a vehicle-wheel and having its axis obliquely disposed with respect to the axis of the two arms first mentioned, the axis of said bearings being inclined forwardly so that prolonged it will strike the ground in front of the center of contact of the wheel, substantially as shown and described.

10. In a motor road-vehicle, the combination with an axle having a fork or yoke at each end and bearings carried by the arms or fork of said yoke with their axis inclined from the vertical, and means to connect the axle with the body of the vehicle, of a three-armed supplementary axle, two of said arms being supported in said bearings and the third arm being adapted to receive a vehicle-wheel and having its axis obliquely disposed with respect to the axis of the two arms first mentioned, the axis of said bearings being inclined forwardly so that prolonged it will strike the ground in front of the center of contact of the wheel, substantially as shown and described.

11. In a motor road-vehicle, the combination with an axle having a fork or yoke at each end, a cone-bearing carried by the lower arm of said fork or yoke, a ball-thrust bearing carried by the upper arm of said fork or yoke, the axis of said bearings being inclined from the vertical, and means to connect the axle with the body of the vehicle, of a three-armed supplementary axle, two of said arms being supported in said bearings and the third arm being adapted to receive a vehicle-wheel, substantially as shown and described.

12. In a motor road-vehicle, the combination of an axle, independent steering-wheels mounted on said axle, a double set of springs connected to the body of the vehicle and to the axle and straddling the axle, one set in front of the axle and the other set behind the same, and links connecting the ends of each set of springs to said axle substantially in the horizontal plane of the axis of the steering-wheels, whereby the axle is supported against movement in a horizontal plane and is permitted to move in a vertical plane, substantially as shown and described.

13. In a motor road-vehicle, the combination of an axle, independent steering-wheels mounted on said axle, a double set of upper and lower springs, the lower springs straddling the axle, brackets secured to the body of the vehicle and having the upper springs connected thereto, and links connecting the ends of said springs to said axle substantially in the horizontal plane of the axis of the steering-wheels, substantially as shown and described.

14. An axle for a motor road-vehicle having integral forked ends, the members of each fork being formed with bearings the common axis of which is inclined from the vertical in the normal position of the axle, both with respect to the length of the axle outwardly and transversely thereto forwardly.

15. A journal for a vehicle-wheel, having a transverse supporting-pivot at one end so inclined that its axis if prolonged would intersect the center plane of the wheel at or near the ground line, and forwardly of the perpendicular or contact-point of the wheel.

16. In a motor-vehicle, the combination with an axle having a fork or yoke at each end and means to connect the axle to the body of the vehicle, of a stub-axle having a spindle, a supplemental bearing-piece in the lower member of the fork for engagement with the lower end of said spindle, a relatively large supplemental bearing-piece in the upper end of said fork, said last-named bearing-piece coöperating to form an anti-friction-bearing between said spindle-top and fork member, and a detachable steering-arm securely fastened against rotation to said spindle.

17. In a motor road-vehicle, the combination with an axle having a fork or yoke at each end and means to connect the axle to the body of the vehicle, of a stub-axle having a spindle, a bearing having one end of said spindle in one member of the fork, an annulus threaded adjustably in the other member of the fork, a lock-nut to secure the same in adjusted position, said annulus coöperating with an annulus on the spindle to form a ball-race, and balls in said race, substantially as shown and described.

18. A two-wheeled steering-truck for motor road-vehicles comprising a main axle, a spring system to connect the axle with the body, supplementary axles swiveled upon the ends of said main axle to receive the steering-wheels, jack-bolts to connect the main axle with the body and permit relative vertical movement of the axle and body while preventing relative horizontal movement of the axle and body, a steering-post supported on the body and universally-jointed connections between the steering-post and the supplementary axles, substantially as shown and described.

19. In a motor road-vehicle, the combination with a main axle, means for yieldingly connecting the same to the body of the vehicle and connections between the axle and body whereby displacement of said axle in a horizontal plane is prevented, of a supplementary axle swiveled on the main axle at each end thereof to support the steering-wheels, the swiveling axis of each of the supplementary axles prolonged striking the ground in front of the center of contact of their respective wheels, substantially as shown and described.

20. An interchangeable running-gear for motor road-vehicles, consisting of two distinct parts, one part embodying a transverse axle, individually-pivoted steering-wheels at either end thereof, means connecting the axle with the body to resist relative longitudinal movement, and springs interposed between the axle and the body to support the body thereon and permit limited vertical movement of the body with respect to the axles, the other part of the running-gear embodying a transverse axle with driving-wheels on the ends thereof, a driving mechanism forming an essential part thereof, means connecting the axle with the body of the vehicle to permit relative movement of the body and prevent relative horizontal movement, and springs interposed in the connections between the axle and the body to permit relative vertical movement of the axle with respect to the body.

21. An interchangeable running-gear for motor road-vehicles, consisting of two distinct parts, one part embodying a transverse axle, individually-pivoted steering-wheels at either end thereof, means connecting the axle with the body to resist relative longitudinal movement, and springs interposed between the axle and the body to support the body thereon and permit limited vertical movement of the body with respect to the axles, and means to prevent turning of the axle, the other part of the running-gear embodying a transverse axle with driving-wheels on the ends thereof, a driving mechanism forming an essential part thereof, means connecting the axle with the body of the vehicle to permit relative movement of the body and prevent relative horizontal movement, and springs interposed in the connections between the axle and the body to permit relative vertical movement of the axle with respect to the body, whereby the driving mechanism is included as a substantial portion of the second element and is bodily removable with it from the vehicle and associated with it to constitute a complete driving unit.

22. A two-wheeled steering-truck for motor road-vehicles, comprising a main axle, a spring system for connecting the axle with the body, supplementary axles swiveled on the ends of the said main axle to receive the steering-wheels, jack-bolts to connect the main axle with the body and permit relative vertical movement of the axle and body while preventing relative horizontal movement of the axle and body, a steering-post supported on the body, means connecting said axles whereby they are operated in unison, and a universally-jointed connection between said means and steering-post, substantially as described.

23. An interchangeable running-gear for motor road-vehicles consisting of two distinct parts, and a frame to which the two parts are secured and held in the proper relative position, one part of the running-gear embodying a non-pivoted transverse axle, steering-wheels, spring connections above the non-pivoted transverse axle and steering mechanism projecting above the frame, and the other part of the running-gear embodying the driving-wheels, the driving-wheel axle, spring connections above the driving-wheel axle, and the motor.

This specification signed and witnessed this 24th day of May, A. D. 1899.

HIRAM PERCY MAXIM.

In presence of—
MAUD L. CLARK,
HERMANN F. CUNTZ.

It is hereby certified that in Letters Patent No. 845,106, granted February 26, 1907, upon the application of Hiram Percy Maxim, of Hartford, Connecticut, for an improvement in "Motor Road-Vehicles," an error appears in the printed specification requiring correction, as follows: On page 3, lines 105–108, after the word "body" the clause "a steering-post supported on the body and universally-jointed connections between the steering-post and said supplementary axles" should be stricken out and inserted after the word "body," in line 111, same page; and that the said Letters Patent should be read with this correction therein that the same may conform to the record of the case in the Patent Office.

Signed and sealed this 7th day of May, A. D., 1907

[SEAL.]

E. B. MOORE,
*Acting Commissioner of Patents.* vertical movement of the axle and body while preventing relative horizontal movement of the axle and body, a steering-post supported on the body and universally-jointed connections between the steering-post and the supplementary axles, substantially as shown and described.

19. In a motor road-vehicle, the combination with a main axle, means for yieldingly connecting the same to the body of the vehicle and connections between the axle and body whereby displacement of said axle in a horizontal plane is prevented, of a supplementary axle swiveled on the main axle at each end thereof to support the steering-wheels, the swiveling axis of each of the supplementary axles prolonged striking the ground in front of the center of contact of their respective wheels, substantially as shown and described.

20. An interchangeable running-gear for motor road-vehicles, consisting of two distinct parts, one part embodying a transverse axle, individually-pivoted steering-wheels at either end thereof, means connecting the axle with the body to resist relative longitudinal movement, and springs interposed between the axle and the body to support the body thereon and permit limited vertical movement of the body with respect to the axles, the other part of the running-gear embodying a transverse axle with driving-wheels on the ends thereof, a driving mechanism forming an essential part thereof, means connecting the axle with the body of the vehicle to permit relative movement of the body and prevent relative horizontal movement, and springs interposed in the connections between the axle and the body to permit relative vertical movement of the axle with respect to the body.

21. An interchangeable running-gear for motor road-vehicles, consisting of two distinct parts, one part embodying a transverse axle, individually-pivoted steering-wheels at either end thereof, means connecting the axle with the body to resist relative longitudinal movement, and springs interposed between the axle and the body to support the body thereon and permit limited vertical movement of the body with respect to the axles, and means to prevent turning of the axle, the other part of the running-gear embodying a transverse axle with driving-wheels on the ends thereof, a driving mechanism forming an essential part thereof, means connecting the axle with the body of the vehicle to permit relative movement of the body and prevent relative horizontal movement, and springs interposed in the connections between the axle and the body to permit relative vertical movement of the axle with respect to the body, whereby the driving mechanism is included as a substantial portion of the second element and is bodily removable with it from the vehicle and associated with it to constitute a complete driving unit.

22. A two-wheeled steering-truck for motor road-vehicles, comprising a main axle, a spring system for connecting the axle with the body, supplementary axles swiveled on the ends of the said main axle to receive the steering-wheels, jack-bolts to connect the main axle with the body and permit relative vertical movement of the axle and body while preventing relative horizontal movement of the axle and body, a steering-post supported on the body, means connecting said axles whereby they are operated in unison, and a universally-jointed connection between said means and steering-post, substantially as described.

23. An interchangeable running-gear for motor road-vehicles consisting of two distinct parts, and a frame to which the two parts are secured and held in the proper relative position, one part of the running-gear embodying a non-pivoted transverse axle, steering-wheels, spring connections above the non-pivoted transverse axle and steering mechanism projecting above the frame, and the other part of the running-gear embodying the driving-wheels, the driving-wheel axle, spring connections above the driving-wheel axle, and the motor.

This specification signed and witnessed this 24th day of May, A. D. 1899.

HIRAM PERCY MAXIM.

In presence of—
MAUD L. CLARK,
HERMANN F. CUNTZ.

It is hereby certified that in Letters Patent No. 845,106, granted February 26, 1907, upon the application of Hiram Percy Maxim, of Hartford, Connecticut, for an improvement in "Motor Road-Vehicles," an error appears in the printed specification requiring correction, as follows: On page 3, lines 105–108, after the word "body" the clause "a steering-post supported on the body and universally-jointed connections between the steering-post and said supplementary axles" should be stricken out and inserted after the word "body," in line 111, same page; and that the said Letters Patent should be read with this correction therein that the same may conform to the record of the case in the Patent Office.

Signed and sealed this 7th day of May, A. D., 1907

[SEAL.]

E. B. MOORE,
*Acting Commissioner of Patents.*

It is hereby certified that in Letters Patent No. 845,106, granted February 26, 1907, upon the application of Hiram Percy Maxim, of Hartford, Connecticut, for an improvement in "Motor Road-Vehicles," an error appears in the printed specification requiring correction, as follows: On page 3, lines 105–108, after the word "body" the clause "a steering-post supported on the body and universally-jointed connections between the steering-post and said supplementary axles" should be stricken out and inserted after the word "body," in line 111, same page; and that the said Letters Patent should be read with this correction therein that the same may conform to the record of the case in the Patent Office.

Signed and sealed this 7th day of May, A. D., 1907

[SEAL.]

E. B. MOORE,
*Acting Commissioner of Patents*